United States Patent [19]

Old

[11] 4,108,463

[45] Aug. 22, 1978

[54] IMPLEMENT SUPPORT LINKAGES

[75] Inventor: John Leslie Old, Kenilworth, England

[73] Assignee: Massey-Ferguson Services N.V., Detroit, Mich.

[21] Appl. No.: 752,047

[22] Filed: Dec. 20, 1976

[30] Foreign Application Priority Data

Dec. 24, 1975 [GB] United Kingdom ............... 52791/75

[51] Int. Cl.² ............................................. B60D 1/14
[52] U.S. Cl. .................................. 280/460 A; 172/450
[58] Field of Search .......... 280/461 A, 460 A, 456 A, 280/474, 446 B; 172/450, 443

[56] References Cited

U.S. PATENT DOCUMENTS

| 2,796,818 | 6/1957 | Tanke et al. ..................... 172/450 X |
| 2,822,738 | 2/1958 | Smith ............................... 172/443 X |
| 3,078,930 | 2/1963 | Foote ............................... 172/450 X |
| 3,207,529 | 9/1965 | Harper ............................. 280/474 X |

FOREIGN PATENT DOCUMENTS 1,254,397 11/1967 Fed. Rep. of Germany .......... 172/450

Primary Examiner—John A. Pekar
Attorney, Agent, or Firm—John C. Thompson

[57] ABSTRACT

A stabilizer arm for a tractor hitch has an extension which traverses the draft link and abuts an adjustable stop. Adjustment of the stabilizer may thus be made on the inner surface of the draft links whilst the stabilizer is located on the outer surface.

10 Claims, 4 Drawing Figures

IMPLEMENT SUPPORT LINKAGES

This invention relates to implement support linkages adapted to be mounted on a tractor vehicle and in particular to stabilizer assemblies for such linkages.

Implement support structures comprising a pair of lower links universally jointed to a tractor and elevatable by a power lift are well known. Such structures usually have a check chain associated with each link which operates to limit the transverse movement of the links. If it is required to fix the implement relative to the tractor and prevent all movement in a transverse direction then stabilizer assemblies are use. Each assembly may comprise a bar or chain of adjustable length adapted to be connected between a link and the tractor. When the assembly is in place its length is adjusted so that movement of the links is prevented. In the case of a chain the movement in one direction only is prevented but the implement acts to rigidly connect the pair of links so that a rigid structure is formed.

The assemblies are usually connected on the outer side of the links since the space between the links is used for implements and power drives for the implements.

When the assemblies are used on tractors having a narrow track, such as vineyard tractors, adjustment of the stabilizers becomes difficult due to the lack of space.

It is an object of the present invention to provide a stabilizer assembly which permits ease of adjustment when used on narrow track tractors and obviates or mitigates the above disadvantages.

According to the present invention there is provided a stabilizer assembly adapted to be connected at one end to a vehicle and at the other end to a lower link of an implement supporting structure, said assembly comprising a stablizer arm, and an extension connected to said arm and adapted to traverse said link to abut a stop mounted thereon.

According also to the present invention there is provided an implement support structure comprising at least one supporting link adapted to be connected to a vehicle and a stabilizer assembly adapted to be connected between said link and said vehicle, said stabilizer assembly comprising a stabilizer arm and an extension traversing said link and abutting a stop mounted on said link.

Preferably said stop is adjustable.

Preferably also said extension slides in a slot in said link.

An embodiment of the invention will now be described by way of example only with reference to the accompanying drawings in which.

Figure 1:
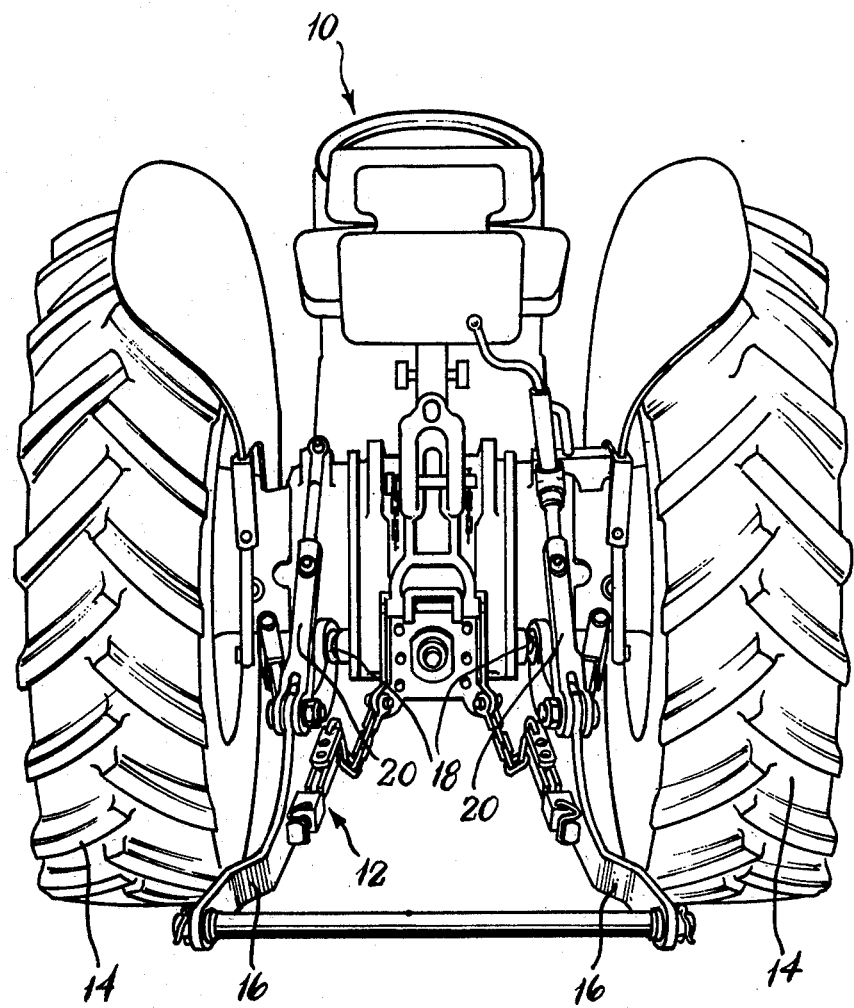
FIG. 1 is a rear view of a tractor.

Referring now to FIG. 1, a tractor 10 is provided with an implement supporting structure 12. The tractor 10 is adapted for use in vineyards and so has wheels 14 set at a small track width.

The implement supporting structure 12 comprises a pair of lower links 16 each of which is pivoted to the tractor by ball joints 18. A lift rod 20 is connected between each link 16 and an associated lift arm 22 which may be raised or lowered by a hydraulic lift (not shown).

The outer extremity of each link 16 is provided with a ball joint 24 to allow attachment of an implement in the conventional manner.

Figure 2:
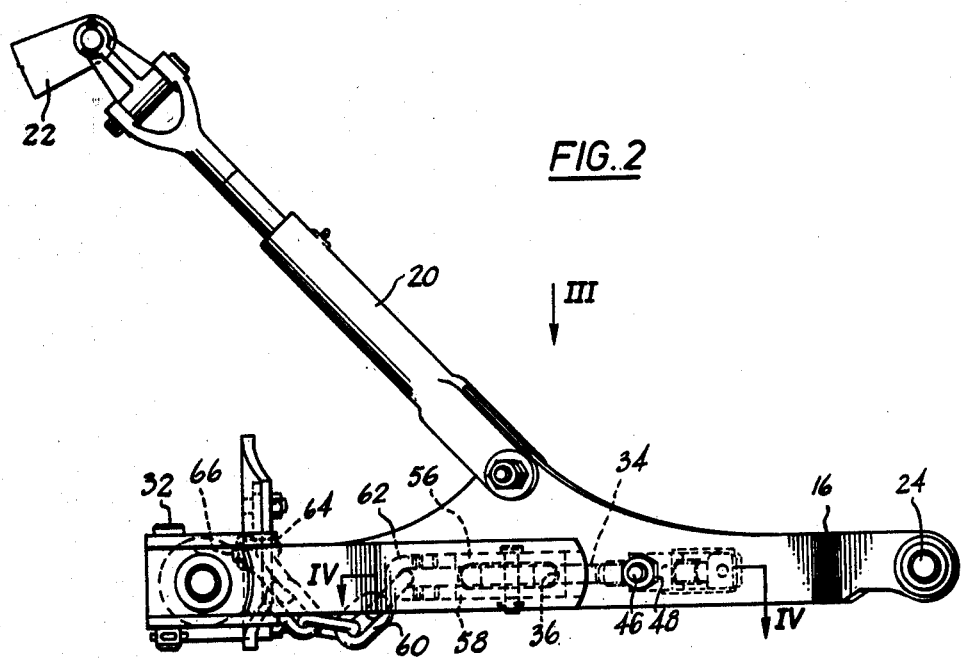
FIG. 2 is a side view of the implement supporting structure of the tractor shown in FIG. 1.
Figure 3:
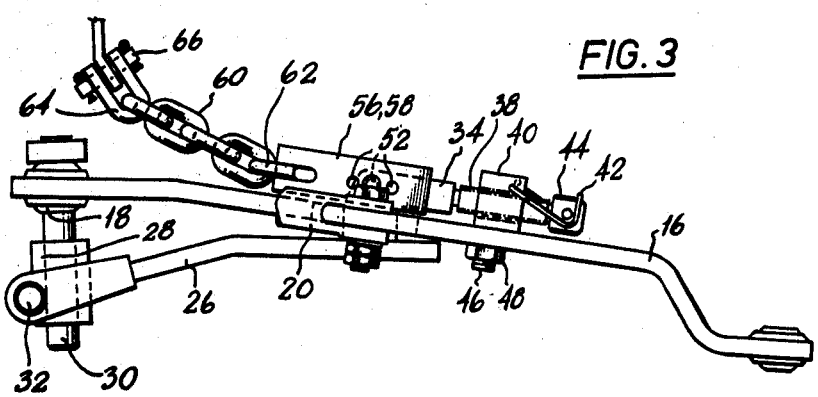
FIG. 3 is a view in the direction of arrow III in FIG. 2.
Figure 4:
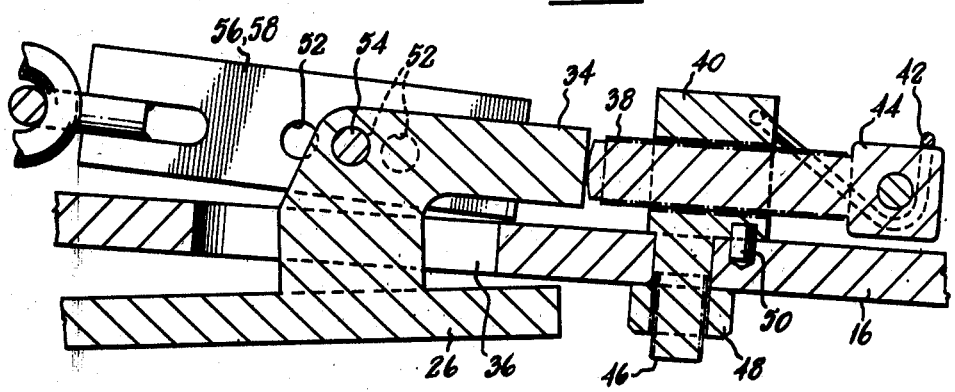
FIG. 4 is a view on the line IV to IV of FIG. 2 on an enlarged scale.

As can best be seen in FIGS. 2 and 3, each link 16 is provided with a stabilizer arm 26 which is connected to the tractor 10 by a universal joint comprising a yoke bored to accommodate a pair of mutually perpendicular pins 30, 32, one of which is mounted on the tractor and the other of which is connected to the stabilizer arm 26. The other end of the stabilizer arm 26 is provided with an L shaped extension 34 which passes through a slot 36 in the link 16. The end of the extension 34 abuts a bolt 38 which is threaded in a block 40 mounted on the link 16 and prevented from turning by a wire clip 42 engaging the squared head 44 of the bolt 38. The block 40 is held on the link 16 by a stud 46 and nut 48 and located by a dowel pin 50.

The extension 34 is provided with holes 52 through which a pin 54 passes to secure a pair of plates 56, 58 to the extension 34. The plates 56, 58 are connected to a check chain 60 by means of a U shaped link 62 welded to each plate 56, 58. The check chain 60 is connected to the tractor 10 by a clevis 64 and pin 66 in the usual manner. The plates 56, 58 are provided with several holes 52 to allow for adjustment of the length of the check chain 60.

The operation of the device is as follows. With the bolt 38 fully retracted in the block 40 the extension 34 is free to slide in the slot 36 and so the link 16 is free to swing in a lateral direction. If the links 16 are fully raised the check chains 60 will tighten and prevent any lateral sway.

The bolt 38 may be adjusted to abut the extension 34 and so limit the travel in the slot 36 and prevent any outward movement beyond a predetermined position. When the links 16 are rigidly interconnected by an implement the bolts 38 may be adjusted to limit the sway in their respective directions so that the implement is rigidly located.

It will be seen that the arrangement of the stabilizer assembly allows simple adjustment of the stabilizers without encroaching on the space normally occupied by drive lines for the implements. Adjustment bolt 38 is readily accessible giving convenience of adjustment and improved operator safety.

Also it should be noted that the loads imposed on the check chains 60 are decreased since they are taken partly by the stabilizer arm 26, the arm 26 and the chain 60 operating on a wide triangular base instead of small offset of check chain to lower link.

What we claim is:

1. An implement support linkage in combination with a vehicle, the implement support linkage comprising;
    an implement supporting lower link, one end of which is connected to the vehicle;
    an adjustable stop mounted on one side of the link remote from said one end, said stop being adjustable towards and away from said one end of the lower link;
    a stabilizer arm having one end interconnected to the vehicle, and an extension remote from its said one end traversing the lower link and abutting the stop.

2. The implement support linkage as claimed in claim 1 wherein the lower link is provided with an elongated slot, the extension traversing the lower link by passing through the slot.

3. The implement support linkage as claimed in claim 2 further characterized by the provision of a check chain having one end secured to the vehicle and the other end secured to the extension adjacent the stop.

4. The implement support linkage as claimed in claim 3 wherein the extension has a series of holes and the chain is adjustably connected to the extension by a pin passing through one of the holes.

5. An implement support linkage in combination with a vehicle, said implement support linkage comprising:
 a pair of laterally spaced apart rearwardly extending elongated lower draft links, the forward ends of which are connected to laterally spaced apart portions of the vehicle;
 a pair of adjustable stops mounted on the inner rearward side portions of the lower draft links; and
 a pair of laterally spaced apart generally rearwardly extending stabilizers the forward ends of which are connected to the vehicle at locations outwardly of the forward ends of the lower draft links, and each of the stabilizers being provided with a rearward extension which traverses one of said draft links and is adapted to contact an adjustable stop to limit lateral sway of said lower draft links.

6. The implement support linkage as claimed in claim 5 wherein each of said adjustable stops comprises a block fixed to one of said lower draft links and a bolt threadingly received in said block, said bolt being arranged to abut said extension to limit movement thereof.

7. The implement support linkage as claimed in claim 6 further characterized by the provision of a latch associated with each stop to lock said bolt and prevent movement between the bolt and the block.

8. The implement support linkage as claimed in claim 5 in which each of the lower draft links is provided with an elongated slot, the extension of said stabilizers traversing the links by passing through said slots.

9. The implement support linkage as claimed in claim 8 further characterized by the provision of a pair of check chains the forward ends of which are secured to said vehicle between the forward ends of the lower link means, and the rearward portions of which are secured to the extensions of said stabilizers inwardly of the sides of the lower draft links.

10. The implement support linkage as claimed in claim 9 wherein each of said extensions has a series of holes, the chain being connected to said extension by a pin passing through one of said holes.

* * * * *